Feb. 18, 1958     C. H. FUCHSMAN     2,823,981
METHOD OF RECOVERING AMMONIA FROM AMMONIUM CHLORIDE
Filed Jan. 9, 1956
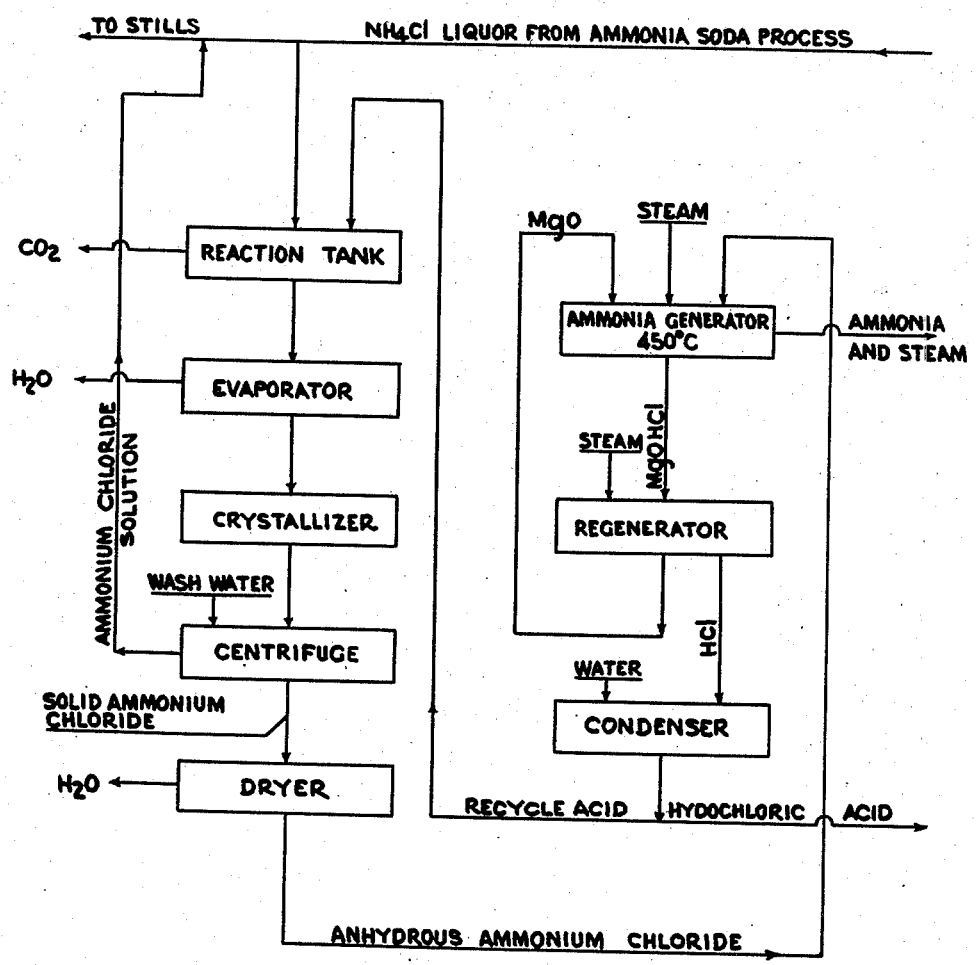
INVENTOR.
CHARLES H. FUCHSMAN
BY
ATTORNEY

United States Patent Office 2,823,981
Patented Feb. 18, 1958

2,823,981
METHOD OF RECOVERING AMMONIA FROM AMMONIUM CHLORIDE

Charles H. Fuchsman, Corpus Christi, Tex., assignor to Columbia-Southern Chemical Corporation, Allegheny County, Pa., a corporation of Delaware Application January 9, 1956, Serial No. 557,936

9 Claims. (Cl. 23—193)

This invention relates to a method of recovering ammonia from ammonium chloride. In the practice of the process of producing sodium carbonate according to the ammonia-soda process, sodium chloride is reacted in aqueous medium with an ammonium carbonate with ultimate production of ammonium chloride and sodium bicarbonate. The sodium bicarbonate is recovered and processed to produce sodium carbonate. The ammonium chloride normally is treated with lime to free the ammonia which is distilled from the solution and is recycled. The reaction of lime with ammonium chloride produces calcium chloride which has limited use. Consequently, a large amount of the calcium chloride thus produced is discarded.

According to the present invention, a novel method of recovering ammonia from ammonium chloride has been provided. This process is particularly advantageous since it permits recovery of the chlorine content thereof in the form of hydrochloric acid. Consequently, when this process is used in connection with the conventional process of producing sodium carbonate, the amount of calcium chloride produced may be materially decreased or even eliminated.

According to this invention, ammonia is recovered from ammonium chloride by contacting the ammonium chloride with magnesium oxide in the presence of sufficient water vapor to substantially prevent formation of magnesium chloride. The exact concentration of water vapor required depends upon the temperature of contact. For most purposes the partial pressure of the water in the vapor or atmosphere in contact with the magnesium oxide should exceed 30 percent of the total partial pressure of HCl and water vapor in contact with the magnesium oxide and ammonium chloride during such reaction. By this means the magnesium oxide is converted to MgOHCl without substantial formation of $MgCl_2$. Thus, it has been found that when magnesium oxide is heated with ammonium chloride at a temperature of 200 to 500° C., usually 325 to 500° C., in the presence of the required amount of water vapor, the magnesium oxide absorbs HCl from the ammonium chloride forming MgOHCl and little or no $MgCl_2$, and liberating the ammonia.

The resulting MgOHCl may be further heated to cause evolution of HCl and regeneration of the MgO for use in an ensuing cycle. An especially advantageous feature of this process is that when the particles of MgO initially used are relatively coarse, for example, larger than 100 mesh, no appreciable disintegration of the particles occurs when the MgOHCl is formed and MgO regenerated therefrom whereas substantial disintegration takes place during such a cycle when $MgCl_2$ is produced in the course of reaction with ammonium chloride.

It has been found that HCl which is taken up by the MgO according to the process herein contemplated may be driven off by heating the MgOHCl thus produced at a more elevated temperature, usually in excess of 450 to 500° C., in the presence of enough water vapor to maintain the partial pressure of water vapor in the vapor over the MgOHCl formed as described above at least about 40 percent of the total partial pressure of water and HCl therein. In consequence of this heating, HCl is driven off as a gas and the magnesium oxide is regenerated. The HCl gas may be recovered by conventional means as, for example, by direct condensation or by absorption in aqueous solution to form hydrochloric acid solution. The magnesium oxide obtained may be recycled for further treatment of ammonium chloride.

Thus, according to this invention, a cyclic process has been provided whereby ammonium chloride is reacted with magnesium oxide to cause absorption of HCl therefrom, the ammonia is separated from the magnesium oxide containing the absorbed HCl, and then the magnesium oxide-HCl product is heated to drive off HCl. This process is particularly advantageous since it not only produces ammonia but also produces hydrochloric acid or gaseous HCl which is of substantially greater chemical utility than calcium chloride.

In effecting the reaction between ammonium chloride and magnesium oxide, the ammonium chloride is heated in solid or vapor state while in contact with magnesium oxide. Preferably, the process is conducted by heating magnesium oxide and solid ammonium chloride together in a reactor. It may also be conducted by heating magnesium oxide, separately vaporizing ammonium chloride, and passing a stream of ammonium chloride vapor through or over the bed of hot magnesium oxide. The temperature to which the magnesium oxide is heated should be sufficiently high to cause vaporization of ammonium chloride and substantial absorption of HCl from the ammonium chloride vapor. On the other hand, if the temperature is too high, the absorption will be inadequate or may even fail to occur. It has been found, according to this invention, that best results are achieved when the magnesium oxide is heated to a temperature below 500° C. Usually, the magnesium oxide bed should be maintained above about 200° C., the preferable range being in the range of 325 to 500° C.

While applicant does not intend to be bound by a theoretical explanation of the reactions which occur, it appears that they are substantially as follows:

(1) $\quad NH_4Cl \rightarrow NH_3 + HCl$ (2) $\quad HCl + MgO \rightarrow MgOHCl$ Unless special precautions are taken, a further reaction may occur:

(3) $\quad MgOHCl + HCl \rightarrow MgCl_2 + H_2O$

Therefore, it is essential to conduct the operation in a manner such that the formation of magnesium chloride (apparently due to Reaction 3) is minimized or substantially prevented. This is desirable because the magnesium chloride will, during subsequent HCl liberation, decrepitate to a fine powder as a consequence of its hydrolysis to form $MgO \cdot MgOHCl$, on the other hand, does not change its particle size significantly on conversion to MgO and HCl. Furthermore, $MgCl_2$ may react with small quantities of air in the reaction gas to form elemental chlorine, whose subsequent reaction with ammonia to form chloroamine could constitute a safety hazard. For optimum results permitting formation of little or no magnesium chloride or chlorine, the minimum amount of water vapor in the gas phase of the reaction mixture may be determined by the following equation:

$$-RTLnK = +50 + 14.07\ TLgT -$$
$$5.8 \times 10^{-3}T^2 - 1.03 \times 10^5 T^{-1} - 36.65T$$

where R is the gas constant, Ln denotes the logarithm to the base $e$, Lg denotes the logarithm to the base 10, T is the temperature in degrees Kelvin, and K is the ratio of the partial pressure of hydrogen chloride to partial pressure of water in the vapor.

The following table tabulates the desired minimum partial pressure of water vapor over the magnesium oxide (neglecting the ammonium chloride, ammonia, and other untabulated compounds in the vapor) for several temperatures. The minimum partial pressure for optimum results at other temperatures may be computed according to the above equation.

TABLE I

| Temperature, ° Kelvin | Partial Pressure of HCl, percent by volume | Partial Pressure of water, percent by volume |
| --- | --- | --- |
| 600 | 67 | 33 |
| 650 | 64 | 35 |
| 700 | 62 | 38 |
| 800 | 58 | 42 |

Lower amounts of water permit some formation of $MgCl_2$.

The desired concentration of water vapor may be established by passing a stream of steam or water vapor over magnesium oxide which is in contact with ammonium chloride vapor. It will be understood that the exact amount of water vapor may be varied within substantial limits. That is, excess water vapor above the amount specified according to the above equation does not adversely affect the reaction to any appreciable degree. Of course, the amount of water vapor should not become so large as to make the concentration of ammonium chloride relatively low since this will tend to slow the reaction down or to impose the requirement that a large bed of magnesium oxide be used. On the other hand, smaller amounts of water will permit the production of increased amounts of magnesium chloride. At all events, where it is desired to make recourse to a cyclic process in which hydrogen chloride is generated and the magnesium oxide is recycled, it is normally preferred to utilize an amount of steam sufficient to prevent conversion of more than 5 percent, and preferably substantially less than 1 percent, of the magnesium content to magnesium chloride in a single pass.

The magnesium oxide which is used according to this invention normally is in the form of a powder or granules. In order to avoid dust problems, it is usually desirable to make use of a granular form of magnesium oxide having a particle size larger than 100 mesh, usually about 10 to 100 mesh. Surprisingly enough, the practice of this process does not cause disintegration of the granules and thus the magnesium oxide remains in granular form through many cycles. This is advantageous since it is much easier to effect efficient absorption when the magnesium oxide is in granular form.

Magnesium oxide most suitable for use according to this invention is the granular product produced by calcination of granular magnesite. Such magnesium oxide is in a form that is peculiarly adaptable to the present process since it is capable of forming MgOHCl without disintegration. Apparently, in calcination of the magnesium carbonate, pores are left in the oxide by the carbon dioxide which is driven off. When this porous product is exposed to the action of $NH_4Cl$, the HCl absorbed enters the porous structure without impairment of the physical properties thereof. This is important since otherwise disintegration of the granular magnesium oxide would occur, thus impairing the effectiveness of the process.

In the practice of the process, ammonium chloride in vapor form is contacted with the magnesium oxide with absorption of HCl and release of $NH_3$. This $NH_3$ is collected and absorbed in water. An especially convenient method of accomplishing this process is by heating a mixture of solid ammonium chloride and magnesium oxide while passing steam over the mixture. In this way liberated ammonia can be collected conveniently by condensing the steam which has been passed over the mixture with or without addition of further water during absorption.

The resulting ammoniacal solution may contain some quantity of ammonium chloride except in those cases where the ammonium chloride is completely reacted. If desired, this mixture may simply be recycled to the ammonia stills commonly used in the ammonia-soda process for producing soda ash. On the other hand, the ammonia may recovered separately from the water and ammonium chloride by suitable fractionation.

The magnesium oxide which has been treated with the ammonium chloride contains a large amount of MgOHCl. The amount of MgOHCl which is present depends of course upon the degree of reaction of the magnesium oxide with the ammonium chloride. Usually, this reaction is conducted in a manner such that there always remains an appreciable amount of magnesium oxide in order to remove HCl as completely as possible from the ammonium chloride-ammonia vapors. Some magnesium chloride also may be present, as has been explained above.

The hydrogen chloride may be removed from this mixture by a further heating after the ammonia vapor has been removed therefrom. This heating may be conducted at any convenient temperature at which the hydrogen chloride comes off, usually at a temperature higher than that of the hydrogen chloride absorption. In general, however, it is found that it is desirable to heat the MgOHCl to a temperature above about 500° C., usually in the range of 500 to 800° C. While higher temperatures may be used, they offer no advantages, complicate corrosion problems and, in extreme cases, result in adverse calcination of the magnesium oxide to the extent that it reacts inefficiently when recycled.

As a consequence of this heating, HCl is evolved and magnesium oxide is regenerated. This magnesium oxide then may be recycled to the process of treatment of further amounts of ammonium chloride. The HCl may be recovered by conventional means as discussed above.

To prevent conversion of MgOHCl to magnesium chloride ($MgCl_2$) during heating thereof in this hydrogen chloride liberation step, it is necessary to conduct the heating in an atmosphere of water vapor. The amounts of water required for optimum results may be determined readily in accordance with the principles discussed above in connection with the hydrogen chloride absorption step.

The following table sets forth the minimum water concentration in terms of the percent of the total partial pressure of HCl and water vapor which must be maintained in the vapor in contact with the MgOHCl during such heating:

TABLE II

| Temperature, ° K. | Partial Pressure of $H_2O$, percent by volume |
| --- | --- |
| 773 | 41 |
| 823 | 42 |
| 873 | 43 |
| 973 | 45 |

Generally speaking, this partial pressure of water vapor should be at least 40 percent of the sum of the partial pressure of HCl and water vapor in contact with the MgOHCl during such heating. Unless this concentration is maintained, formation of $MgCl_2$ is produced and the MgO is not regenerated.

The accompanying flow sheet of the drawing diagrammatically illustrates the process herein contemplated as applied to the treatment of liquors produced in the ammonia-soda process. These liquors normally contain 190 grams per liter of $NH_4Cl$, 45 to 60 grams per liter of ammonium carbonate, and 70 to 90 grams per liter of NaCl. They may also contain an appreciable amount of free ammonia, usually in the range of 15 to 25 grams per liter. In normal practice of the ammonia-soda process, this liquor is supplied to a distillation unit where free ammonia is distilled off. Thereupon, the residual ammonium chloride is treated with lime with consequent production of calcium chloride and liberation of combined ammonia which also is distilled off. The distillation of free ammonia and treatment of the solution with lime to liberate combined ammonia may be, and frequently is, conducted in a single operation.

As illustrated on the drawing, a portion of the ammonium chloride liquor normally passing to the stills is diverted to a reaction tank where it is treated with enough hydrochloric acid to react with ammonium carbonate which is in the liquor, liberating carbon dioxide in essentially a pure state and forming a further quantity of ammonium chloride. The resulting ammonium chloride solution is evaporated in a suitable evaporator and solid ammonium chloride is crystallized from the concentrated solution in a suitable crystallizer. The mother liquor is removed from the crystallized ammonium chloride by centrifuging or filtration or other suitable means. The mother liquor and any wash liquor used to wash the crystals are recycled to the ammonium chloride liquor line and are conducted to the stills conventionally used as described above.

The solid ammonium chloride is dried to remove water, and the resulting anhydrous ammonium chloride is vaporized and passed to the ammonia generator where it is treated with magnesium oxide, as has been described above. The resulting MgOHCl is supplied to the magnesium oxide regenerator where it is heated in a steam atmosphere to release HCl and to regenerate MgO. This MgO is recycled to the ammonia generator as shown in the drawing. The HCl is withdrawn from the regenerator and is condensed in a suitable manner. A portion of the aqueous solution of hydrochloric acid thus obtained is recycled to the reaction tank for reaction of further ammonium chloride liquor in order to decompose ammonium carbonate therein, as already described.

The following examples are illustrative of the present invention:

Example I

Twenty grams of magnesia and 27 grams of solid ammonium chloride were placed in the center of a furnace tube and the tube was heated. After preheating to approximately 200° C., a stream of saturated steam was passed over the magnesium oxide-ammonium chloride mixture at the rate of 0.4 gram of water per minute. The resulting stream of steam and ammonia was withdrawn from the tube and collected in an absorber containing water as the absorbing liquid. When the temperature reached 450° C., heating was discontinued and the tube was purged with air. The solids and the contents of the absorber were analyzed. It was found that 74 percent of the ammonia in the ammonium chloride was absorbed in the water.

Example II

Sixty grams of calcined magnesite (MgO) having a particle size of about minus 16 to plus 35 mesh was mixed with 6.5 grams of solid anhydrous ammonium chloride, and the mixture was placed in a tube furnace. The furnace was heated to a temperature of 475° C. over a period of 85 minutes while passing a stream of steam through the mixture at a rate such that 28.6 grams of water as steam was passed through the mixture within this period of time. The resulting mixture of water and liberated ammonia was removed from the furnace and was absorbed in water.

The magnesium oxide containing absorbed HCl remaining in the tube was heated to the temperature indicated in the table for a period of 74 minutes while introducing steam through the magnesium oxide-MgOHCl mixture at a rate such that 21.3 grams of water was passed through the mixture. The resulting HCl which was driven off from the mixture was condensed and absorbed in water as a solution of hydrochloric acid.

This process was repeated 9 times. In each cycle after cycle 1, 9.96 grams of ammonium chloride was mixed with the resulting magnesium hydroxide obtained from the previous heating step. The following table sets forth the conditions of time of operation, temperature of heating, and amount of water passed through the reaction mixture as steam in both the ammonia generation step and also in the hydrogen chloride generation step.

TABLE III

| Cycle | Ammonia Generation | | | Hydrogen Chloride Generation | | |
|---|---|---|---|---|---|---|
| | Time (min.) | Max. temp., °C. | Water (grams) | Time (min.) | Max. temp., °C. | Water (grams) |
| 1 | 85 | 475 | 28.6 | 74 | 675 | 21.3 |
| 2 | 41 | 500 | 15.0 | 62 | 680 | 25.6 |
| 3 | 75 | 475 | 29.6 | 80 | 680 | 18.1 |
| 4 | 37 | 475 | 12.4 | 61 | 685 | 20.8 |
| 5 | 76 | 475 | 26.7 | 77 | 680 | 19.8 |
| 6 | 77 | 480 | 20.5 | 82 | 685 | 20.6 |
| 7 | 42 | 485 | 13.2 | 74 | 690 | 22.6 |
| 8 | 77 | 485 | 22.3 | 90 | 690 | 16.9 |
| 9 | 43 | 490 | 12.9 | 62 | 700 | 17.6 |

Over 90 percent of the ammonia and about 88.6 percent of the HCl in the ammonium chloride fed to the process were recovered as separate ammonia and HCl solutions.

Example III

In the cyclic process shown in the drawings, 763 tons per day of liquor containing 190 grams per liter of ammonium chloride and 80 grams per liter of sodium chloride is supplied from the ammonia-soda process for producing sodium carbonate. This liquor is supplied to a reaction tank and is mixed with 77 tons of recycle hydrochloric acid and containing 38 percent by weight of HCl, thus liberating 30 tons of essentially pure carbon dioxide. The remaining solution is concentrated to crystallize out 111 tons of ammonium chloride, and the mother liquor containing 53 grams per liter of ammonium chloride is sent to the stills for lime treatment and distillation of ammonia.

The crystallized ammonium chloride, after drying, is heated at 450° C. with 178 tons of magnesium oxide and 25 tons of steam, thus liberating 37 tons of ammonia which is withdrawn and recovered. The remaining MgOHCl is heated at 650° C. while adding 32 tons of steam, and the vapors are collected in a suitable condenser.

Although the present invention has been described with reference to the specific details of certain embodiments thereof, it is not intended that such details shall be regarded as limitations upon the scope of the invention except insofar as included in the accompanying claims.

This application is a continuation-in-part of my copending application Serial No. 347,570, filed April 8, 1953.

What is claimed:

1. A method of recovering ammonia from ammonium chloride which comprises passing a stream of steam over magnesium oxide in contact with ammonium chloride at a temperature of 200 to 500° C. whereby to cause absorption of evolved HCl from the ammonium chloride and release of ammonia in vapor state, and withdrawing and condensing the resulting ammonia vapor-steam mixture whereby to produce an aqueous solution of ammonia, the amount of steam so passed over the magnesium oxide being in addition to any moisture generated by reaction in consequence of contact of magnesium oxide with ammonium chloride and being sufficient to establish a water vapor pressure over the magnesium oxide of at least 30 percent of the sum of partial pressures of water vapor and HCl in said atmosphere.

2. A method of recovering ammonia from ammonium chloride which comprises contacting ammonium chloride with magnesium oxide at a temperature of 200 to 500° C. while maintaining present enough water vapor to establish a partial pressure of water vapor in the atmosphere over the magnesium oxide at least 30 percent of the sum of the partial pressure of water vapor and HCl in said atmosphere whereby HCl evolved from the ammonium chloride is absorbed by the magnesium oxide and ammonia is released.

3. A method of recovering ammonia from ammonium chloride which comprises contacting ammonium chloride with magnesium oxide at a temperature of 700° Kelvin while maintaining present enough water vapor to establish a partial pressure of water vapor in the atmosphere over the magnesium oxide at least 38 percent of the sum of the partial pressures of water vapor and HCl in said atmosphere whereby HCl evolved from the ammonium chloride is absorbed by the magnesium oxide and ammonia is released.

4. The process according to claim 3 wherein the magnesium oxide is in the form of granules having a particle size of 10 to 100 mesh.

5. A method of recovering ammonia from ammonium chloride which comprises contacting ammonium chloride with magnesium oxide at a temperature of 200 to 500° C. while maintaining present enough water vapor to establish a partial pressure of water vapor in the atmosphere over the magnesium oxide at least 33 percent of the sum of the partial pressure of water vapor and HCl in said atmosphere whereby HCl evolved from the ammonium chloride is adsorbed by the magnesium oxide and ammonia is released, removing the ammonia and heating the resulting solid residue in an atmosphere in which the partial pressure of water vapor is maintained above 40 percent of the total partial pressure of water vapor and HCl therein and at a temperature of 500 to 700° C. until MgO has been regenerated and HCl released.

6. The process of claim 5 wherein the magnesium oxide is in granular form having a particle size larger than 100 mesh.

7. A method of recovering ammonia from ammonium chloride which comprises contacting ammonium chloride with magnesium oxide at a temperature of 200 to 500° C. while maintaining present enough water vapor to establish a partial pressure of water vapor in the atmosphere over the magnesium oxide at least 30 percent of the sum of the partial pressure of water vapor and HCl in said atmosphere whereby HCl evolved from the ammonium chloride is absorbed by the magnesium oxide and ammonia is released, removing the ammonia from the magnesium oxide-HCl reaction product, and thereafter heating said product at a temperature of at least 500° C. in an atmosphere in which the partial pressure due to water vapor is at least 40 percent of the sum of the partial pressure of HCl and water vapor whereby to release HCl and regenerate magnesium oxide.

8. A method of recovering ammonia from ammonium chloride which comprises contacting ammonium chloride with magnesium oxide at a temperature of 200 to 500° C. while maintaining present enough water vapor to establish a partial pressure of water vapor in the atmosphere over the magnesium oxide at least 30 percent of the sum of the partial pressure of water vapor and HCl in said atmosphere whereby HCl is absorbed from the ammonium chloride by the magnesium oxide and ammonia is released, removing the ammonia from the magnesium oxide-HCl reaction product, thereafter heating said product at a temperature of at least 500° C. in an atmosphere in which the partial pressure due to water vapor is at least 40 percent of the sum of the partial pressure of HCl and water vapor whereby to release HCl and regenerate magnesium oxide, and recycling the regenerated magnesium oxide for treatment of further ammonium chloride.

9. The process of claim 2 wherein the magnesium oxide is calcined granular magnesite.

References Cited in the file of this patent

UNITED STATES PATENTS

| 379,487 | Mond | Mar. 13, 1888 |

FOREIGN PATENTS

| 14,001 | Great Britain | Oct. 15, 1887 |
| 3,759 | Japan | Sept. 19, 1952 |

OTHER REFERENCES

J. Soc. Chem. Ind., Japan 47, 849–50 (1944), cited in Chem. Abstracts 43:1918$i$, 1919$a$ through $e$.

U. S. DEPARTMENT OF COMMERCE
PATENT OFFICE

CERTIFICATE OF CORRECTION

Patent No. 2,823,981  Charles H. Fuchsman  February 18, 1958

It is hereby certified that error appears in the printed specification of the above numbered patent requiring correction and that the said Letters Patent should read as corrected below.

Column 2, line 69, for that portion of the equation reading " +50+ " read -- -50+ --; column 4, line 13, after "may" insert --be--.

Signed and sealed this 24th day of June 1958.

(SEAL)
Attest:
KARL H. AXLINE
Attesting Officer

ROBERT C. WATSON
Commissioner of Patents